Figure 1:
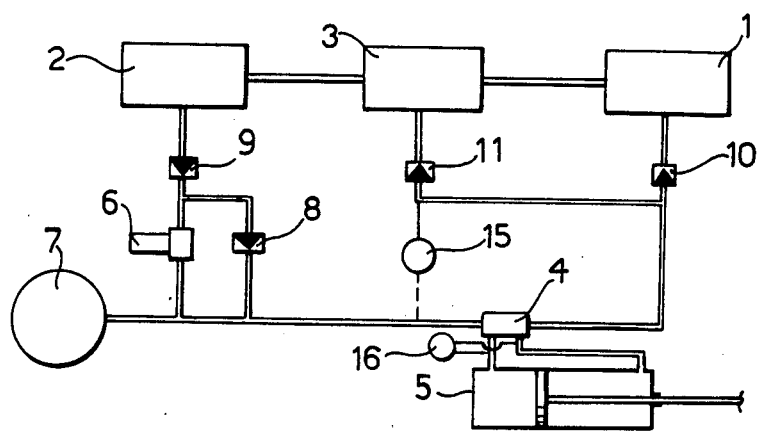

United States Patent [19]

Cordiano

[11] Patent Number: 4,751,977
[45] Date of Patent: Jun. 21, 1988

[54] POWER STEERING FOR MOTOR VEHICLES WITH POWER ASSISTANCE INCREASED BY MEANS OF AN INTERMITTENTLY OPERATING PUMP

[75] Inventor: Ettore Cordiano, Turin, Italy
[73] Assignee: Corint S.r.l., Turin, Italy
[21] Appl. No.: 3,346
[22] Filed: Jan. 14, 1987

[30] Foreign Application Priority Data

Jan. 14, 1986 [IT] Italy ................................ 67027 A/86

[51] Int. Cl.⁴ .............................................. B62D 5/06
[52] U.S. Cl. ...................................... 180/132; 60/430
[58] Field of Search .................. 180/132, 133; 60/430, 60/428, 486

[56] References Cited

U.S. PATENT DOCUMENTS 3,952,510 4/1976 Peterson .......................... 180/133 X

FOREIGN PATENT DOCUMENTS 57-114761 7/1982 Japan ..................................... 180/132

Primary Examiner—John A. Pekar
Attorney, Agent, or Firm—Sughrue, Mion, Zinn, Macpeak and Seas

[57] ABSTRACT

A power steering system for motor vehicles includes a two chamber piston and cylinder actuator connected to an output member output member of the steering system and first and second sources of fluid pressure having different absolute pressures p1 and p2, respectively, wherein p2 is greater than p1. A regulating valve is connected between the sources and the actuator for controlling the pressure medium sources to each chamber of the actuator in response to torque applied to an input element of the steering system. An additional pump is connected between at least one of the sources and the actuator for increasing the pressure difference in the actuator when appropriate. The fluid utilized is air, and the system normally operates without the use of the additional pump using only the pressure jump p2−p1 between the first and second sources.

18 Claims, 2 Drawing Sheets

POWER STEERING FOR MOTOR VEHICLES WITH POWER ASSISTANCE INCREASED BY MEANS OF AN INTERMITTENTLY OPERATING PUMP

The present invention relates to a rack-type power steering system, of the sort comprising;
a rack,
a helically-toothed pinion,
a two-chamber actuator cylinder which assists the axial movements of the rack,
a regulating valve which, in dependence on the torque applied to the pinion, adjusts the pressure jump between the two chambers of the actuator,
a fluid reservoir,
two fluid sources at different absolute pressures p1 and p2, in which p2 is greater than p1.

The object of the invention is to increase the effect of the power assistance provided by the actuator when the pressure difference p2−p1 between the two fluid sources is insufficient.

This may occur, for example, in the case of vacuum operated pneumatic power steering, in parking manoeuvres with the engine idling since under these conditions the flow of the air taken into the engine—by the induction manifold in the case of a petrol engine or by the vacuum pump in the case of a diesel engine—is not sufficient to evacuate the chambers of the actuator rapidly enough.

The object is achieved by the invention in that an additional pump is provided to increase the pressure difference used by the actuator when appropriate, the system normally operating without the additional pump and using only the pressure jump p2−p1 between the two fluid sources.

Since the pump works only occasionally, therefore, it and any electrical control motor may be of such dimensions as to work under overload, thus giving simple solutions which would be absolutely unacceptable for a continuously operating pump.

This involves a considerable reduction in cost for the pump itself and consequently for the entire power steering system.

Figure 2:
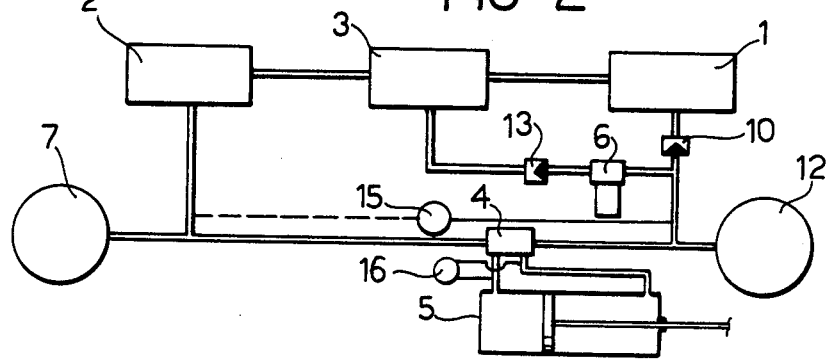
Figure 5:
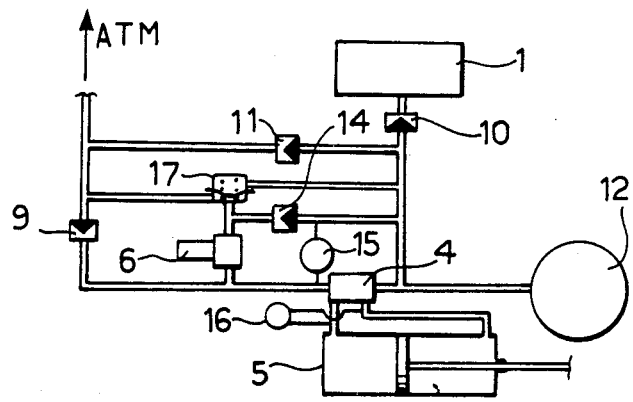
Figure 3:
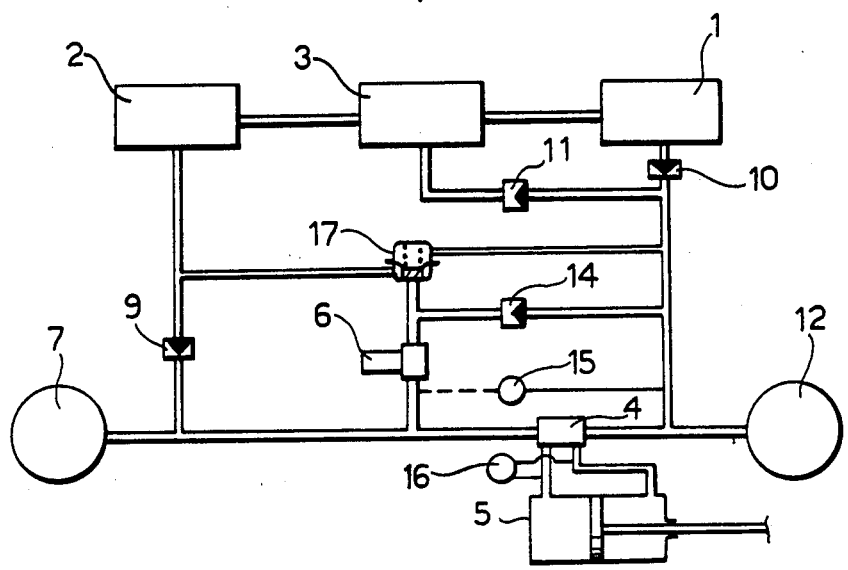
Figure 4:
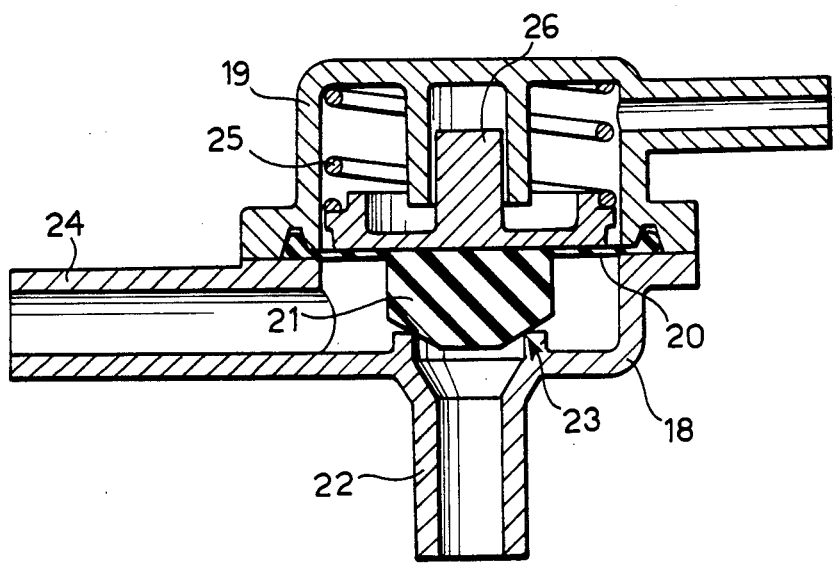

The invention will now be described with reference to the drawings indicated, in which:

FIG. 1 is a schematic diagram of a system according to the invention in which the additional pump is used to increase the higher pressure p2, FIG. 2 shows a schematically a system in which the additional pump is used to lower the lower pressure p1, FIG. 3 shows an arrangement in which the pump is used both to increase the pressure p2 and to lower the pressure p1, FIG. 4 shows a possible constructional embodiment of a diverter valve, FIG. 5 shows the diagrammatic arrangement of FIG. 3 applied to a vacuum-operated power steering system.

In the description which follows the parts which have the same function are indicated by the same reference numerals.

With reference to FIG. 1, the low-pressure source p1 is indicated 1, the high-pressure source p2 is indicated 2, the fluid reservoir 3, the regulating valve 4, the two-chamber actuator cylinder 5, and the additional pump 6. It is assumed in this case that the pump is controlled by an electric motor which is switched on or off by means of a barometric switch 15 or 16.

These elements constitute the basic components of the system and they are indeed sufficient to make the system operate.

In fact, the operation of the system is as follows.

The regulating valve 4 regulates the pressure jump between the two chambers of the actuator in dependence on the torque applied to the steering wheel, using the pressure difference between the two fluid sources 1 and 2.

When the assistance provided by the jump p2−p1 is no longer sufficient and the force on the steering wheel becomes excessive, the switches 15 or 16 cause the pump to operate and increase the pressure p2 of the fluid arriving at the valve 4, bringing it to a value p3 greater than p2.

The switch 15 senses the pressure difference between the two parts of the circuit, at high and low pressure or only the lower pressure p1, and switches on the pump when this difference falls below a predetermined given value or when p1 passes a given value.

The switch 16, however, senses the pressure difference between the two chambers of the actuator and switches on the pump when this difference reaches a predetermined value, that is, when the torque reaches a given value.

The system with the switch 16 alone is with one which makes the pump operate as little as necessary, since it is effectively switched on only when required.

In certain cases, however, it is necessary to add the switch 15 to avoid the pressure jump between the two parts of the circuit falling below the value at which the switch 16 acts. In fact, if this were to happen, the switch 16 could no longer operate.

Other components are added to the arrangement which, if not indispensable, serve to improve the operation of the system. These are:

the non-return valve 8. Its function is to allow the passage of fluid from the source 2 to the valve when the pump is of the type which does not allow the free passage of fluid when stopped. Obviously, the valve 8 does allow the return of the fluid to the source 2.

the non-return valve 9. This has the function of keeping the circuit downstream of the pump at a pressure p3 greater than p2 when the pump is stopped. It is not necessary if the pump itself can act as a non-return valve.

the non-return valve 10. Its function is to maintain the low pressure p1 even when the source 1 is inactive.

the dump and non-return valve 11 which has the function of discharging the fluid under pressure in the reservoir rapidly during discharge of the cylinder, without making it pass through the low-pressure source. It is particularly useful in vacuum installations as will be seen below.

the high-pressure accumulator 7 which serves to reduce the frequency of operation of the pump, levelling the pressures upstream of the regulating valve 4.

As stated above, FIG. 2 is a diagram of a circuit in which the pump is used instead to lower the pressure p1 of the low-pressure source, it is applicable to power steering systems which work by using the vacuum created by the engine in the manner described above.

In this arrangement the pump is mounted in parallel with the low-pressure source 1 and discharges the fluid drawn from the power steering circuit into the reservoir 3. In vacuum systems this reservoir is the atmosphere itself.

The non-return valve 13 serves to prevent fluid from the reservoir passing into parts of the low-pressure circuit when the pump is stopped. It may be eliminated if the pump itself acts as a non-return valve.

The low-pressure accumulator 12 may serve to reduce the frequency of operation of the pump, levelling the pressure p1.

FIG. 3 shows a combination of the arrangements of FIGS. 1 and 2. In this, the pump may be used in a first period for lowering the pressure in the part of the circuit connected to the source 1 at pressure p1 and in a second period to increase the pressure in the part connected to the higher pressure source p2.

This is achieved by means of a diverter valve 17 which connects the intake of the pump with the low-pressure part of the circuit until the pressure jump p2−p1 is less than a predetermined value. When this value is reached, the valve connects the intake of the pump to the high-pressure circuit and inreases the pressure in the circuit at pressure p2.

FIG. 4 shows schematically one possible constructional embodiment of the diverter valve. It is constituted essentially by two half-shells 18 and 19 between which a flexible diaphragm 20 having a shutter 21 is interposed. The unions 22 for connection to the intake of the pump, the seat 23 against which the shutter 21 seals, and the union 24 for the fluid from the source 2 are formed on the half-shell 18. The interior of the half-shell 19 is in communicaton with the low-pressure part of the circuit.

A suitably calibrated spring 25 urges the shutter 21 against its seat 23 by means of the elements 26 and prevents the inlet of fluid at pressure p2 into the pump as long as the difference p2−p1 is less than a given value. Above this value, the pressure jump p2−p1 overcomes the load of the spring and the port 23 is opened to allow the pump to draw from the source p2. The non-return valve 14 prevents the fluid from the source 2 passing into the low-pressure parts.

As stated above, the two accumulators 7 and 12, which are useful but not dispensible, serve to reduce the frequency of operation of the pump.

FIG. 5 shows the arrangement of FIG. 3 applied to a power steering system which normally works under vacuum and which is powered, when necessary, by means of the additional pump.

In this case, the fluid is air and the fluid reservoir and the pressure source p2 are the atmosphere itself.

The low-pressure source is constituted by the induction manifold in a petrol engine and by the vacuum pump in a diesel engine.

The operation of FIG. 5 corresponds to that of FIG. 3. Notable in this case is the importance of the dump valve 11 which allows the rapid discharge of the pressurised air from one of the two chambers direct to the atmosphere without its entering either the induction manifold of the petrol engine or the vacuum pump of the diesel engine. Disturbances in the supply and missed ignition could occur in a petrol engine, while the normally limited delivery of the pump in the case of a diesel engine would delay the formation of the low pressure p1.

It should be noted that, in all the diagrams, the switches 15 are connected: by a continuous line to the low-pressure circuit part and by a broken line to the high-pressure part. This is done to indicated that the switch may be made to sense either the pressure p1 or the difference between the pressure immediately upstream of the valve 4 (p2 or p3) and the pressure p1.

I claim:

1. A power steering system for motor vehicles comprising:
    a two chamber piston and cylinder actuator adapted to be connected to an output element of the steering system;
    first and second sources of fluid pressure having different absolute pressures p1 and p2, respectively, wherein p2 is greater than p1;
    a regulating valve connected between said sources and said actuator for controlling the pressure medium from said sources to each chamber of said actuator in response to torque applied to an input element of the steering system; and
    an additonal pump connected between at least one of said sources and said actuator for increasing the pressure difference in said actuator when appropriate, wherein said fluid is air and wherein said system normally operates without the use of said additional pump using only the pressure jump p2−p1 between said first and second sources.

2. A power steering system according to claim 1, characterised in that the additional pump (6) is used to increase the higher pressure from p2 to p3, a pump-bypass circuit with a non-return valve (8) being provided when the pump is of a type such as not to allow the free passage of fluid from the second source (2) at pressure p2 to the regulating valve (4) when the pump is stopped.

3. A power steering system according to claim 2, characterised in that a fluid pressure accumulator (7) is provided in the circuit between the pump and the regulating valve.

4. A power steering system according to claim 2, characterised in that a second non-return valve (9) is located in the line between the pump (6) and the second source (2) of fluid at pressure p2 to prevent the fluid at pressure p3 between the pump and the regulating valve returning to the second source (2) when the pump (6) itself does not act as a non-return valve.

5. A power steering system according to claim 1, characterised in that the additional pump (6) is used to reduce the lower pressure from p1 to p0 and is connected between the regulating valve (4) and the first source (1) of fluid at pressure p1.

6. A power steering system according to claim 1, characterised in that the additional pump (6) is used to reduce the lower pressure from p1 to p0 and is connected between the regulating valve (4) and a reservoir of fluid (3) connected between said sources, a non-return valve (13) being provided between the pump and the reservoir when the pump (6) itself does not act as a non-return valve, to prevent the fluid passing from the reservoir into the circuit at pressure p1 when the pump is stopped.

7. A power steering system according to claim 6, characterised in that an accumulator (12) is connected in the circuit between the valve (4) and the first source (1) at the lower pressure p1, the accumulator being for the low-pressure fluid.

8. A power steering system according to claim 1, characterised in that the additional pump (6) is used to increase the higher pressure p2 when the difference between the pressure (p3 or p2) immediately upstream of the valve and the lower pressure p1 is less than the predetermined value, the pump (6) being switched on and off by means of a barometric switch (15) which senses the lower pressure p1 or the difference between the pressure immediately upstream of the valve (4) (p3 or p2) and p1.

9. A power steering system according to claim 1, characterised in that the additional pump (6) is used to reduce the lower pressure p1 when the difference p2−p1 is less than a predetermined value or the pressure p1 is above a given value, the pump being switched on or off by means of a barometric switch (15) connected to opposite sides of said regulating valve and which senses the pressure difference p2−p1 or the lower pressure p1.

10. A power steering system according to claim 1, characterised in that the additional pump (6) is used (a) in a first period for lowering the pressure p1 when the pressure difference p2−p1 is less than a predetermined value, and (b) in a second period for increasing the higher pressure from p2 to p3 by means of a diverter valve (17) connected between said sources and said pump which senses the difference between p2−p1.

11. A power steering system according to claim 10, characterised in that the diverter valve (17) is constituted by a barometric capsule which senses the pressure difference p2−p1 and connects the intake duct of the aditional pump (6)(a) with the low-pressure part of the circuit when the difference is greater than a predetermined value, (b) with the higher pressure source p2 or with the fluid reservoir when p2−p1 is less than the value, a non-return valve (14) being provided in the intake duct of the pump between the pump (6) itself and the diverter valve (17), to prevent the fluid passing directly from the higher pressure source (2) to the part of the circuit at pressure p1.

12. A power steering system according to claim 11, characterised in that the diverter valve is constituted essentially by two plastic half-shells (18 and 19) between which a diaphragm (20) is interposed, one of the two shells (19) having a union for connection to the low-pressure circuit and the other (18) having a union (24) for the inlet of the pressurised fluid p2 and a union (22) for connection to the intake of the additional pump (6), the outlet of this union (22) being closed by a shutter (21) carried by the diaphragm (20), a preloaded spring (25) being provided to urge the shutter (21), through a thrust member (26), against the seat (23) of the outlet union (22) and keep it closed until the pressure jump p2−p1 reaches a certain predetermined value.

13. A power steering system according to claim 1, characterised in that the additional pump is switched on and off by a barometric switch (16) connected between the two chambers and which senses the pressure difference between the two chambers of the actuator cylinder so that the pump acts when the torque applied to the pinion is greater than a given value and consequently the pressure jump of the fluid in the two chambers is greater than a predetermined value.

14. A power steering system according to claim 13, characterised in that the additional pump is switched on by means of barometric switches both (a) when the pressure difference between the chambers of the actuator is greater than a certain value, and (b) when the difference p2−p1 is less than a predetermined value.

15. A power steering system according to claim 1, characterised in that the circuit further includes a fluid accumulator (12) at a pressure less than p1 or p0 or an accumulator (7) at a pressure greater than p2 or p3, or both said accumulators (7, 12) at the same time.

16. A power steering system according to claims 1, in which air the fluid reservoir and the source of pressure p2 in this case are constituted by the atmosphere itself, adapted to be in that the lower pressure source is constituted the induction manifold of a petrol engine or by the vacuum pump of a diesel engine, and p1 is less than atmospheric pressure and p2 is equal to atmospheric pressure, the additional pump being used, when appropriate, (a) further to reduce the pressure p1, or (b) to increase the pressure p1 above atmospheric, or (c) in a first period to reduce p1 and subsequently to increase p2.

17. A power steering system according to claim 1, characterised in that the pneumatic circuit has a non-return dump valve (11) inserted between the atmosphere and the inlet to the regulating valve at pressure p1, the valve having the function of allowing the rapid evacuation of the air at a pressure greater than atmospheric (a) in order to pass it into the induction manifold in the case of a petrol engine, and (b) in order to delay the lowering of the pressure p1 due to insufficient flow in the vacuum pump of the engine in the case of a diesel engine.

18. A vacuum power steering according to claim 1, characterised in that the additional pump is driven by an electric motor controlled by barometric switches.

* * * * *